INVENTOR.
JOSEPH C. BRENEMAN
BY Hamilton & Cook
ATTORNEYS

April 25, 1967  J. C. BRENEMAN  3,316,339
METHOD AND APPARATUS FOR MOLDING HOLLOW ARTICLES FROM RESINS
Filed June 1, 1965  4 Sheets-Sheet 3
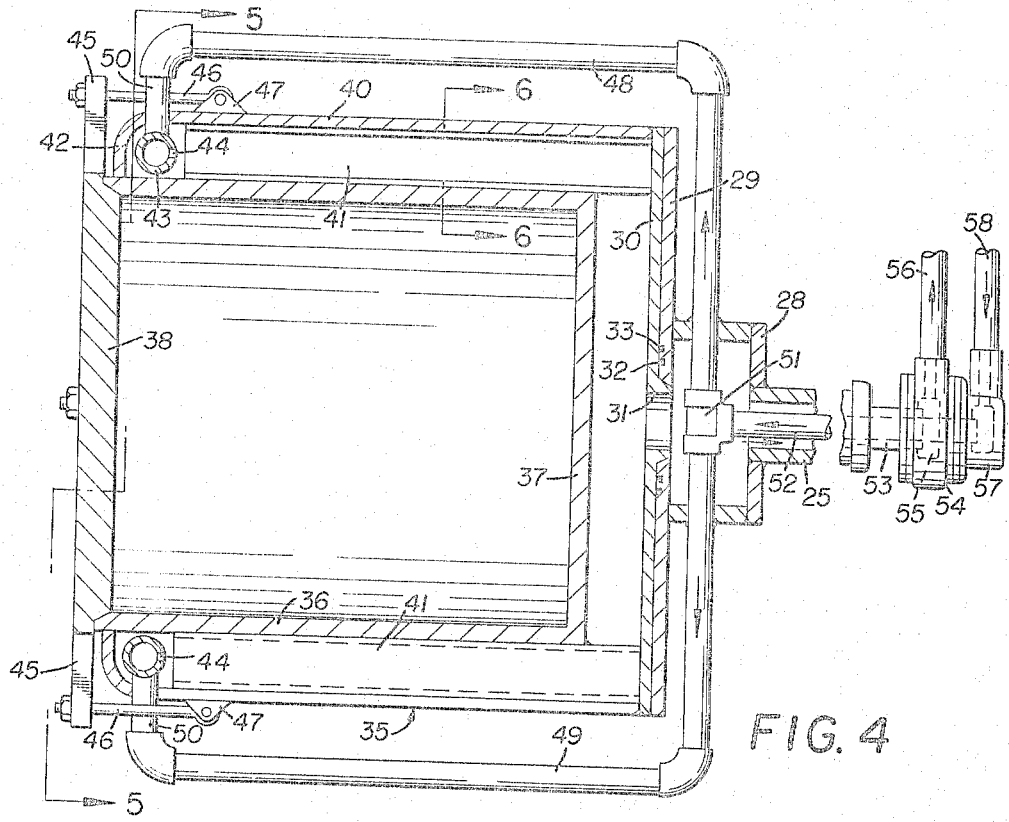
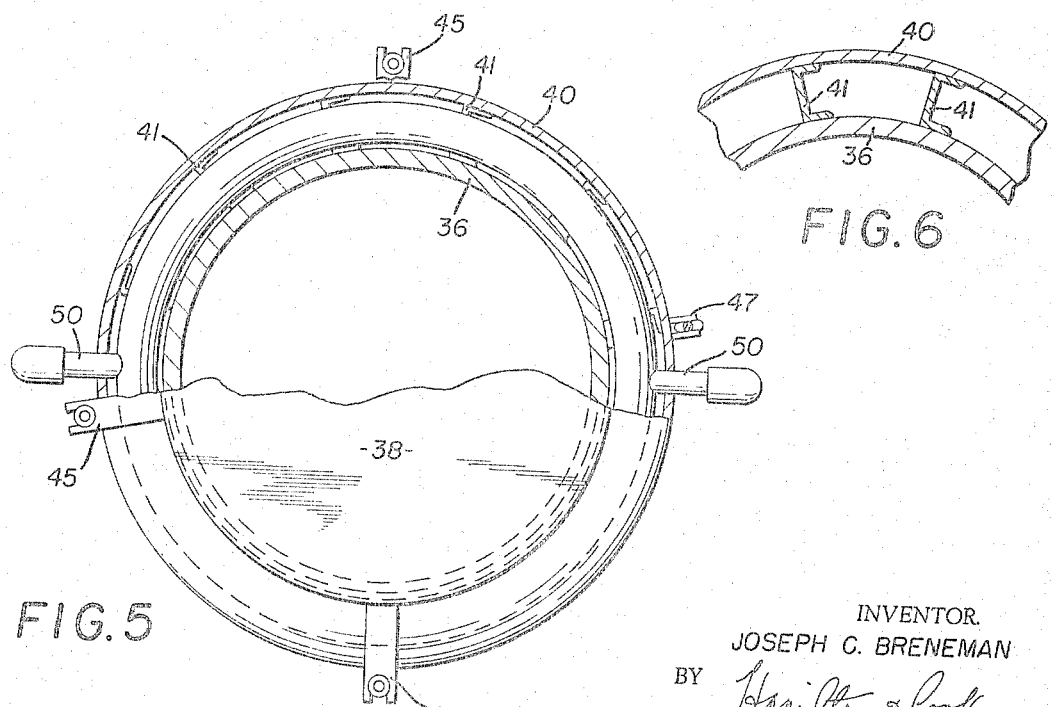
INVENTOR.
JOSEPH C. BRENEMAN
BY *Hamilton & Cook*
ATTORNEYS

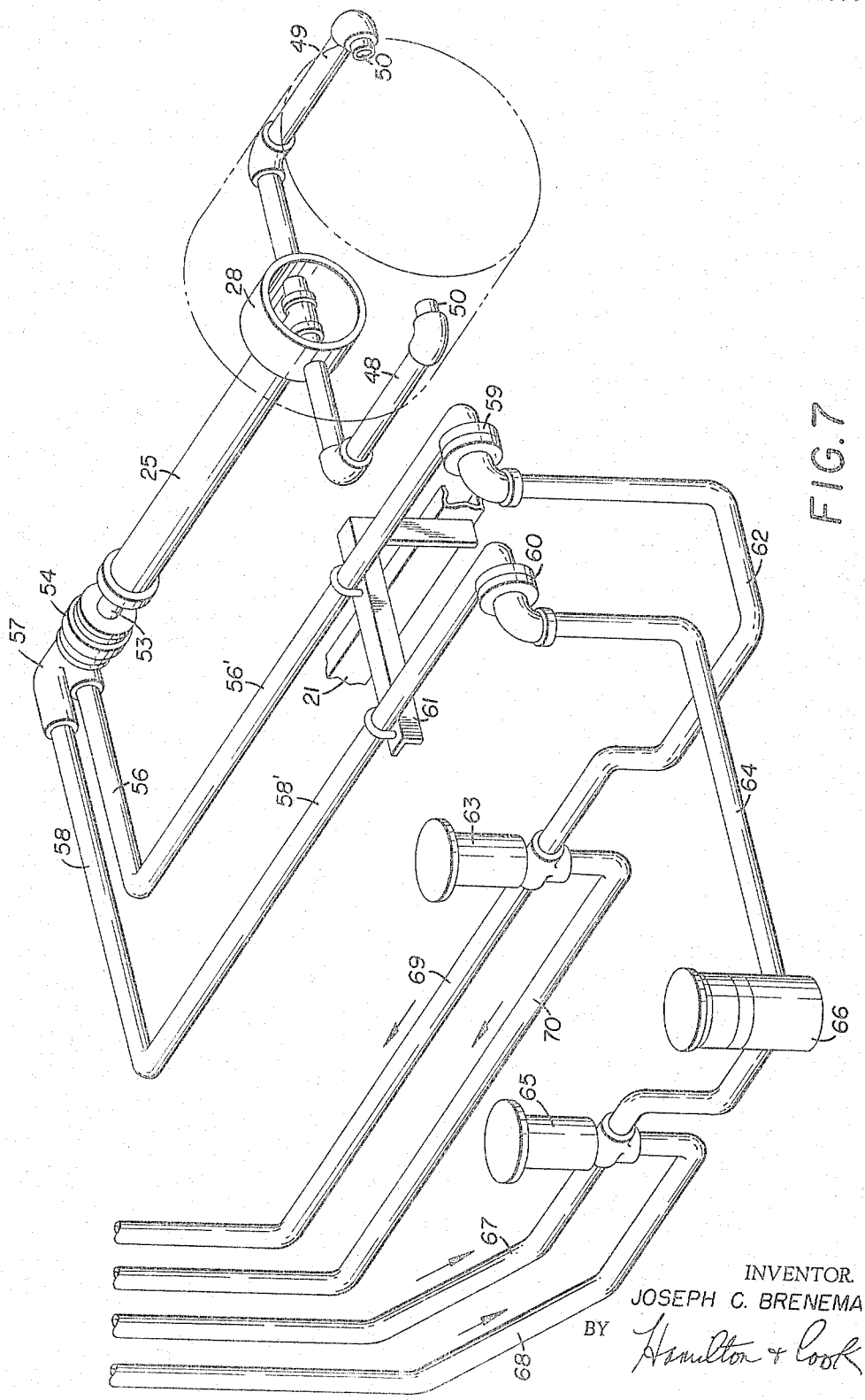

United States Patent Office 3,316,339
Patented Apr. 25, 1967

3,316,339
METHOD AND APPARATUS FOR MOLDING
HOLLOW ARTICLES FROM RESINS
Joseph C. Breneman, Wooster, Ohio, assignor to Rubbermaid Incorporated, Wooster, Ohio, a corporation of Ohio
Filed June 1, 1965, Ser. No. 467,164
3 Claims. (Cl. 264—310)

This application is a continuation-in-part of my copending and now abandoned application Ser. No. 245,777, filed Dec. 19, 1962.

The invention relates generally to molding plastic articles such as containers of substantially cylindrical shape, and more particularly to the molding of such articles from powdered plastic resin materials which are formed by the application of heat and then cooled before removal from the mold.

Certain prior machines for molding such plastic resin materials have comprised a mold holder for rotating a mold on its own axis, and said holder being mounted on a frame which rocks about an axis transverse to the mold axis. This compound movement distributes the material over the surface of the mold before it is formed. The De Bell Patent No. 2,573,693 shows a machine of this type in which the rotating mold is heated by electric heating elements in the jacket of the mold. The Page Patent No. 2,881,476 shows another machine of this type in which the rotating mold is heated by gas burners carried on the frame and directing heat toward the mold. The Knowles Patent No. 3,134,140 shows another machine having gas flames applied to the exterior of the mold.

All of these prior machines have serious disadvantages. The electric heat of De Bell is expensive and requires brushes and slip ring contacts to conduct electric current to the elements in the rotating mold. Moreover, the De Bell apparatus is intended and adapted for distributing liquid material over the mold surfaces, and would not be satisfactory for distributing powder over various shapes because his mold stops and reverses rotation at the end of each rocking motion. This would tend to form an uneven pattern of distribution of powder because it falls from one surface portion to the other whereas a liquid flows from one portion to another. It may be desirable to reverse the rotation of the mold after a number of rotations for certain irregular articles, but this should be selective and not occur automatically at the end of each rocking stroke.

The gas burners of Page and Knowles are inefficient because they are required to heat the surrounding atmosphere as well as the mold, and, further, it is difficult to maintain close control of the mold temperature so as to melt the material rapidy without overheating it, so as to obtain extremely thin or unusually thick uniform coatings.

In all of these prior machines it is necessary to remove the mold from its holder for the cooling treatment, and to provide external cooling means, such as a water bath or sprays, to cool the mold after the heating step in order to remove the molded article.

It is a general object of the present invention to provide an improved method and apparatus for molding hollow articles of plastic resin material, and adapted for molding a variety of irregular shapes and sizes from powdered material.

More specifically, it is an object to provide a rocking and rotating molding machine having improved mold heating and cooling means whereby the mold is efficiently and uniformly heated to closely control uniformity of material during molding and then quickly cooled before removing a part from the mold and without removing the mold from its holder.

Another object is to provide a rocking and rotating machine having improved means for circulating a heating medium through the mold jacket during the heating cycle, and for circulating a cooling medium through the mold jacket during the cooling cycle.

A further object is to provide improved means for varying the speed and the angular extent of the rocking movement of the mold in either direction, and independent means for rotating the mold on its axis.

Another object is to provide an improved molding method wherein a jacketed mold is rotated on a plurality of axes to distribute heat moldable material over the mold surfaces, while a heating medium is circulated through the jacket to coagulate the material on the mold surfaces, and then a cooling medium is circulated through the jacket to cool the molded article before the mold is opened.

These and other objects are accomplished by the improvements comprising the present invention, a preferred embodiment of which is shown by way of example in the accompanying drawings, and described in detail in the following specification. Various modifications and changes in details of construction are comprehended within the scope of the invention as defined in the appended claims.

In the drawings:

FIG. 4 is a fragmentary plan sectional view on line 4—4 of FIG. 1.

FIG. 5 is a front view, partly in section, on line 5—5 of FIG. 4.

FIG. 6 is a fragmentary sectional view on line 6—6 of FIG. 4.

FIG. 7 is a schematic perspective view of the piping for circulating the heating and cooling media through the mold jacket.

Figure 1:
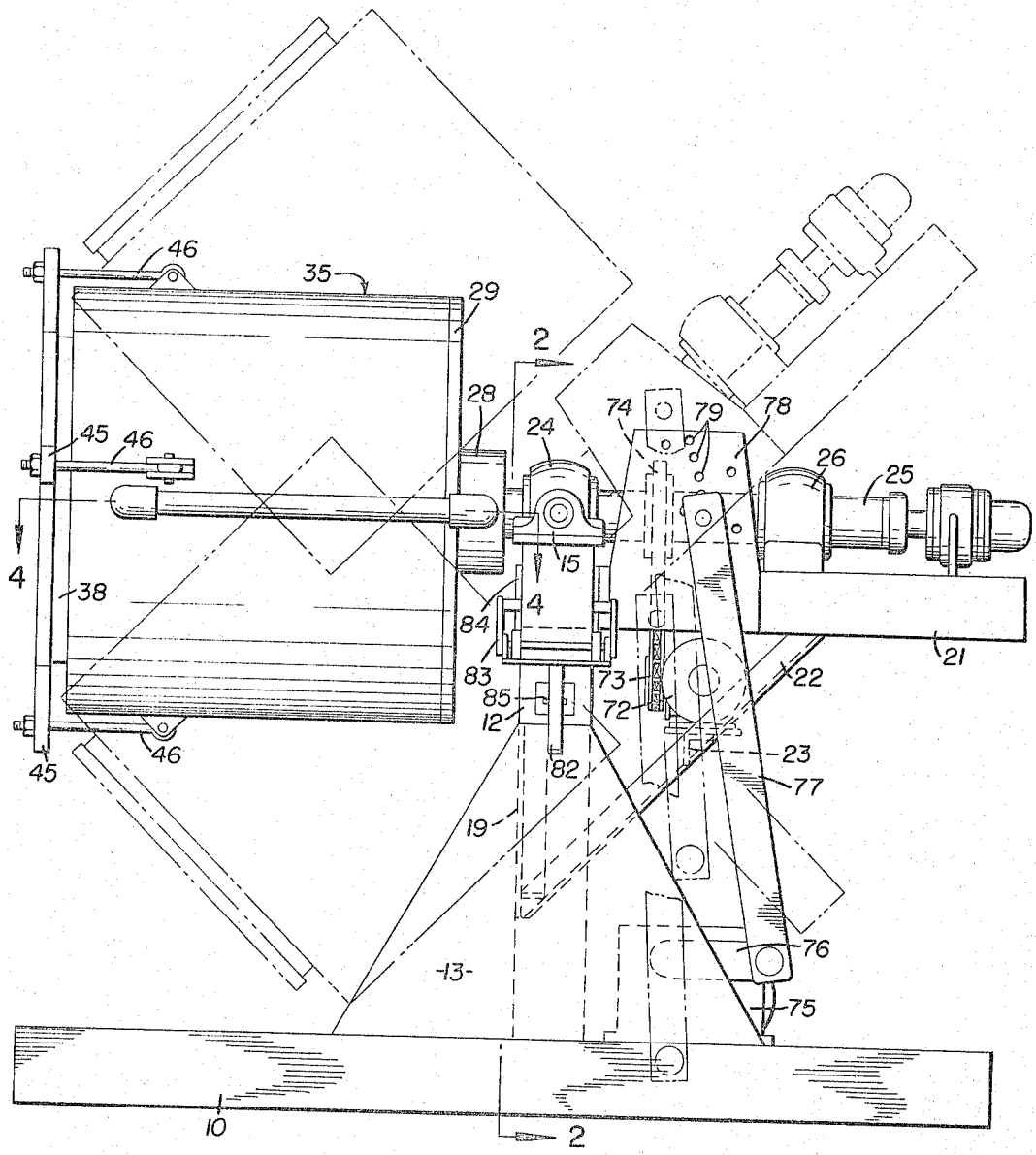
FIG. 1 is a side elevation of the improved machine, the extreme rocking positions being indicated in chain lines.

The mold of the present invention is a hallow mold having a jacket through which a heat transfer medium may be circulated, and a desired internal molding surface corresponding to the external surface of the article to be molded. If a single mold is used the mold is preferably axially mounted on a dual passage hollow shaft journaled in a frame, and drive means is provided for rotating the shaft. Obviously, a plurality or cluster of smaller molds may be carried on and around the shaft. The frame is rocked by independent drive means about an axis transverse to the mold axis, with means for adjusting the angular extent of the rocking movement in either direction. Conduit means circulate a heat transfer medium through a swivel joint to and from the shaft passages which are connected to the mold jacket, and the conduits have swing joints allowing rocking movement of the frame as the shaft is rotated.

The machine preferably comprises a stationary main frame having a base including side members 10 and cross members 11 connected thereto. Upright posts 12 rise from the side members 10 between their ends, and gusset plates 13 and triangular brace plates 14 rigidy support the posts on the base.

The upper ends of the posts 12 carry bearing blocks 15 journaling stub shafts 16 extending inwardly of the blocks, and hanger plates 17 depending from the shafts carry a transverse beam 18 forming part of the rocking frame. Laterally spaced parallel structural members 19 are welded to and depend from beam 18, and are connected at their lower ends by a transverse member 20. Laterally spaced parallel beam members 21 forming part of the rocking frame extend rearwardly from transverse beam 18, and diagonal brace members 22 extend from the lower ends of front members 19 to connect with intermediate portions of the beams 21. A transverse support member 23 connects members 22 intermediate their ends. A front bearing block 24 for the mold shaft 25 is mounted on transverse beam 18 between stub shafts 16, and an aligned rear bearing block 26 is mounted on a similar transverse beam (not shown) extending between the beams 22 intermediate their ends. Preferably, the transverse axis of stub shafts 16 intersects the axis of the shaft bearing blocks 24 and 26.

The mold shaft 25 journaled in bearing blocks 24 and 26 is hollow, and is welded at its front end to a fitting box 28 on the mold holder plate 29 to which the rear wall 30 of the mold jacket is detachably secured by bolts (not shown). This plate 29 provides for mounting different molds.

An opening 31 through jacket wall 30 provides communication between the mold jacket and the box 28, and sealing rings 32 and 33 are provided between plates 29 and 30 around the opening.

The mold indicated generally at 35 is cylindrical in shape, although the shape may be varied as desired. The mold has an inner cylindrical wall 36 and an end wall 37, the outer end wall comprising a detachable cover plate 38. A cylindrical jacket wall 40 surrounds mold wall 36 in spaced relation thereto, and the rear jacket wall 30 is axially spaced from mold end wall 37. Circumferentially spaced channels 41 extend longitudinally between the walls 36 and 40, and are secured, as by welding, to said walls and to the rear jacket wall 30. The mold 35 is designed to form cylindrical articles open at one end, so that it is not necessary to provide a jacket for the cover 38.

The front end of jacket wall 40 curves radially inward at 42 and is secured by welding to the mold wall 36 adjacent its front end. The front ends of channels 41 terminate short of the wall portion 42 to provide space for annular pipe header 43 within the front of the mold jacket. The header 43 has jet openings 44 for directing a fluid medium rearwardly through the jacket between the channels 41.

The cover plate 38 is provided with a plurality of radially outwardly extending ears 45 having bolt apertures for receiving attaching bolts 46 pivotally connected to bracket ears 47 on the jacket wall 35. The cover plate is removed for charging the material to be molded, and for withdrawing the molded article.

Fluid supply conduits 48 and 49 are connected to the header 43 at diametrically opposite locations, by pipe nipples 50 extending in sealed relation radially through the jacket wall 40. Conduits 48 and 49 extend rearwardly along the wall 40 and inwardly along the holder plate 29 and into the box 28, where they connect to the T fitting 51. A supply conduit 52 is connected to the T 51 and extends axially of shaft 25 in spaced relation thereto. The rear end of shaft 25 is coupled to a reduced diameter hollow shaft 53 which is connected to a swivel joint 54 of known construction.

As indicated in FIG. 4, the shaft 53 communicates within the joint with a chamber 55 which is connected to a discharge pipe 56, and the conduit 52 extends through said chamber and communicates with an elbow 57 attached to the joint and connected to a supply pipe 58. Referring to FIG. 7, the discharge and supply pipes 56 and 58 have right-angle bends with the legs 56' and 58' thereof connected to swing joints 59 and 60, respectively. The legs 56' and 58' are anchored to a structural member 61 mounted on one of the beams 22 of the rocking frame. Thus, the pipes 56 and 58 can swing with the rocking frame about the joints 59 and 60 as pivots.

A discharge conduit 62 connects joint 59 to a diaphragm-operated three-way valve 63 of known construction, and a supply conduit 64 connects joint 60 to a similar three-way valve 65. Between the joint 60 and valve 65 a pump 66 is connected in line 64. The pump 66 may be an electrically driven pump of known construction.

One of the supply pipes 67 connected to valve 65 is connected at its other end to a hot oil or other liquid tank or reservoir (not shown) and the other supply pipe 68 is connected at its other end to a cold oil or other liquid tank or reservoir (not shown). Similarly, one of the discharge pipes 69 connected to valve 63 is connected at its other end to the hot oil tank and the other pipe 70 is connected to the cold oil tank. Thus, when the through passages of valves 63 and 65 are open, hot oil is pumped through pipes 67 and 64 into the system, returning through pipes 62 and 69, and when the valves are reversed cold oil is pumped through pipes 68 and 64, returning through pipes 62 and 70.

The supply oil (hot or cold) passes through pipe 52 axially of shaft 25 and pipes 48 and 49 into the manifold 43 from which it is circulated through the mold jacket, and returns through shaft 25 in the annular space around pipe 52 and thence through return pipe 56. The operation of the pump 66 and the three-way valves is preferably controlled by suitable timing mechanism. The temperature of the hot and cold oil tanks is controlled by suitable and well-known means.

When the heating cycle is finished and the valve 65 is actuated to supply cold oil to the system, it is desirable to keep valve 63 open to the hot tank for a short time until substantially all of the hot oil in the system is returned to the hot oil tank before connecting the return line to the cold tank. This operation may be reversed when changing from cold to hot oil circulation. This lag of one three-way valve with respect to the other can be accomplished by the timing means, or by thermostatic controls on the valves.

Figure 2:
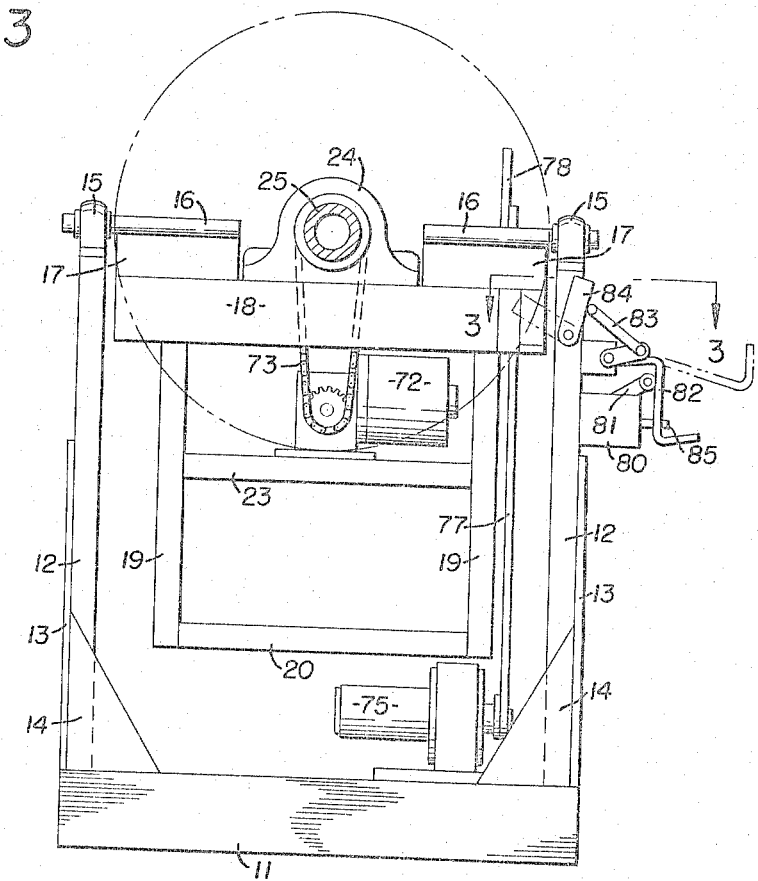
FIG. 2 is a vertical sectional view on line 2—2 of FIG. 1.

Referring to FIGS. 1 and 2, the mold shaft 25 is preferably rotated by means of an electric variable speed reversible motor drive 72 mounted on the transverse member 23 of the swinging frame, and operatively connected by a chain drive 73 to a sprocket 74 on the shaft.

A separate variable speed motor drive 75 driving the rocking frame is mounted on the base of the stationary frame. The motor drives a crank arm 76 connected to a pitman link 77 which is pivoted at its other end to a plate 78 secured to one of the beams 21 of the rocking frame. The plate 78 has a plurality of pivot holes 79 for connection with the link 77, whereby the extent of the rocking motion of the frame can be varied in either or both directions. As shown in FIG. 1, the mold is rocked 45° from horizontal in each direction.

Figure 3:
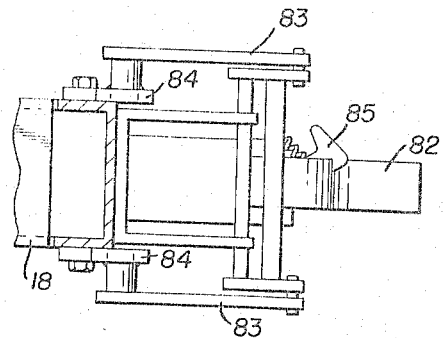
FIG. 3 is a fragmentary sectional view on line 3—3 of FIG. 2.

The motor drives 72 and 75 are preferably connected electrically in circuit in a well-known manner with the timer mechanism controlling the pump 66 and three-way valves 63 and 65. A safety interlock which may be used for preventing operation by accidentally closing the starting switch when the mold is in horizontal charging or unloading position is shown in FIGS. 1–3.

The interlock comprises a switch 80 mounted on a post 12 of the stationary frame and series-connected in the starting switch circuit. Switch 80 has a projecting arm 81 which must be pressed inwardly to close the switch. A hand lever 82 is pivotally connected by a pair of toggle linkages 83 to yoke arms 84 pivoted on post 12 for straddling front beam 18 of the swinging frame when the mold shaft is in horizontal position. Thus, when the mold is being charged or unloaded, the lever 82 is raised to cause yoke arms 84 to straddle beam 18 and hold the mold in horizontal position, as indicated in chain lines in FIG. 2. Since the switch 80 is now open, the operating circuit can not be energized until the lever 82 is lowered to swing the yoke arms 84 away from the rocking frame and then depress switch arm 81 to closing position. As shown, a spring latch 85 may be provided to yieldingly hold the elever 82 in operating position.

In the operation of the improved machine, assuming that the mold is held in horizontal position by the yoke arms 84, and the cover plate 38 is removed, a measured quantity of plastic resin necessary to make the finished article is charged into the open end of the mold. The resin may, for example, be powdered polyethylene, although a number of other plastic materials in powder or liquid form may be used. The mold is then closed by attaching the cover plate 38, and if the interlock is used the lever 82 is lowered to close switch 80. The starting switch is then closed to energize the timing circuit and start the rotation of the mold and the oscillating movement of the rocking frame. As these movements are initiated the pump 66 circulates hot oil through the mold jacket for a predetermined period of time, as set by the timing mechanism.

During the heating cycle, the material will be uniformly distributed over the mold surfaces, and the heat transmitted from the jacket through the mold walls will cause the material to coagulate or melt and build up on the walls 36 and 37 of the mold into a continuous layer of substantially even thickness. If powdered polyethylene is used, the temperature of the hot oil may be 400°–500° F., and the heating time will vary according to the wall thickness of the article being molded.

The independent variable reversible drive 72 for rotating the mold on its axis enables selection of the speed to suit the shape of the article, and selection of a reversing cycle of a number of rotations in one direction and then the other. The adjustable connection of the pitman link 77 to plate 78 enables varying the extent of the rocking movement of the mold in either or both directions from its horizontal position, and its independent variable speed motor enables varying the speed of the rocking movement. Thus, a great variety of irregular shapes and sizes of containers having various wall thicknesses can be molded.

For example, a cylindrical container having a bottom rim of durable high density polyethylene for increased hardness and wear can be molded by inserting a small amounte of high density polyethylene powder and holding the mold at a particular angle of rock while rotating it on its axis and circulating hot oil through the jacket. This sets up a rim of high density polyethylene, after which powdered low density polyethylene can be introduced and the rocking motion started to distribute the latter material over the remainder of the mold and form the container walls.

At the end of the predetermined heating cycle, the timing mechanism will operate the valves 63 and 65 to circulate the cold oil through the mold jacket. For powdered polyethylene, the temperature of the cold oil may be maintained 100°–150° F. for good results. After the cooling cycle the mold is opened and the article removed therefrom without removing the mold from the holder plate 29.

If it is desired to obtain a hollow article having a relatively thick end wall, the rocking movement can be adjusted by selecting a pivot hole in the plate 78 to cause the mold to dwell longer in the down position of the end wall than in the up position. Also, the rocking speed can be varied to aid in accomplishing the desired purpose.

The invention provides an improved rocking and rotating machine for molding plastic resin materials, in which the heating and cooling means are applied to the mold without removing or handling the mold in any way, thereby saving time and labor. The heating and cooling media is wholly contained at all times, so as not to require sprays or catch basins therefor. Moreover, the heating and cooling media is uniformly applied directly to the entire wall of the mold against which the article is being molded, thereby obtaining maximum heat transference, and uniform heating and cooling throughout all parts of the article.

It has been found in actual practice that the use of oil as the heating and cooling medium produces walls of controlled thickness and exceptional uniformity in walls of extreme thinness or thickness. Thus, containers of 10 to 20 cubic feet have been successfully molded with walls having a uniform thickness of the order of .030 to .040 inch, as well as walls having a uniform thickness of the order of ½ inch.

What is claimed is:

1. Apparatus for molding hollow articles from heat moldable powdered resins, including a mold having a jacket, means for continuously rotating the mold at a selected speed about a first axis, independent means for simultaneously rocking the mold at a selected speed in opposite directions from an intermediate position about an axis transverse said first axis, means for varying the extent of the rocking motion in either direction from the intermediate position, means for continuously circulating a heating medium through said mold jacket during a molding cycle while the mold is rotated and rocked and for then circulating a cooling medium through said jacket before opening the mold, and timing mechanism for controlling the operations of rotating the mold, rocking the mold, and circulating the heating and cooling media during the molding cycle.

2. Apparatus as described in claim 1 in which the mold is mounted on a hollow shaft having supply and return passages, and the jacket of the mold communicates with said passages.

3. The method of molding hollow articles from heat moldable resins which comprises placing in a jacketed mold a measured amount of powdered resin, continuously rotating the mold at a selected speed about a first axis and simultaneously independently rocking the mold at a selected speed in opposite directions from an intermediate position about a transverse axis to distribute the resin over the mold surfaces, varying the extent of the rocking motion in either direction from the intermediate position for making articles of various shapes, circulating a heat exchange medium through the mold jacket while the mold is rotating and rocking to build up a layer of said resin on the mold surfaces, and correlating the operation of rotating the mold, rocking the mold, and circulating the heating and cooling media during the molding cycle.

References Cited by the Examiner
UNITED STATES PATENTS

| 2,432,215 | 12/1947 | Stocker | 18—17 |
| 2,659,107 | 11/1953 | De Bell | 264—310 |
| 3,095,260 | 6/1963 | Ferriot | 264—311 |
| 3,117,346 | 1/1964 | Bertin et al. | 18—26 |
| 3,134,140 | 5/1964 | Knowles | 18—26 |
| 3,217,078 | 11/1965 | Kleiber | 264—310 |

ALEXANDER H. BRODMERKEL, *Primary Examiner.*

ROBERT F. WHITE, *Examiner.*

S. I. LANDSMAN, S. HELLER, *Assistant Examiners.*